United States Patent
Kwiatkowski et al.

(10) Patent No.: US 9,121,744 B1
(45) Date of Patent: Sep. 1, 2015

(54) HOT BEVERAGE DISPENSER WITH LEVEL SENSING PROBE AND METHOD OF MAKING SAME

(75) Inventors: Marek K. Kwiatkowski, Round Lake, IL (US); Andrzej Kaminski, Warsaw (PL)

(73) Assignee: FOOD EQUIPMENT TECHNOLOGIES COMPANY, INC., Lake Zurich ( * ) Notice: Subject to any disclaimer, the term of this patent is extended or adjusted under 35 U.S.C. 154(b) by 859 days.

(21) Appl. No.: 13/193,091

(22) Filed: Jul. 28, 2011

Related U.S. Application Data

(63) Continuation-in-part of application No. 12/250,963, filed on Oct. 14, 2008, now Pat. No. 8,464,584.

(60) Provisional application No. 61/369,498, filed on Jul. 30, 2010.

(51) Int. Cl.
G01F 23/26 (2006.01)
G01F 23/24 (2006.01)

(52) U.S. Cl.
CPC ............ *G01F 23/268* (2013.01); *G01F 23/242* (2013.01)

(58) Field of Classification Search
CPC .............................. G01F 23/268; G01F 23/242
USPC .............................................. 73/304 R, 304 C
See application file for complete search history.

(56) References Cited

U.S. PATENT DOCUMENTS

| | | | | |
|---|---|---|---|---|
| 4,166,388 | A | * | 9/1979 | Sun et al. ..................... 73/304 R |
| 4,942,869 | A | * | 7/1990 | Borodulin et al. .............. 601/83 |
| 7,963,164 | B2 | * | 6/2011 | Ross et al. .................. 73/304 C |

* cited by examiner

*Primary Examiner* — Paul West
(74) *Attorney, Agent, or Firm* — James W. Potthast; Potthast & Associates

(57) ABSTRACT

A beverage dispenser (10) having a hollow, insulated dispenser body (12), a removable cover (16) with an inlet opening (24) for receipt of freshly brewed beverage to an interior of the dispenser body (12), a closed bottom (18) and a faucet (22) for dispensing beverage from the body (12) has a level display system including an elongate, relatively flexible, probe body, or down tube (40) with a flexible probe circuit and having a bottom and a top with a plurality of electrically conductive sensors (43, 45, 47 and 49) mounted within an elongate mounting groove (182, FIGS. 21-23) formed in, and extending along, the elongate relatively rigid probe body (36). The flexible probe assembly (40) is secured within the groove by non-adhesive means, either by a thermal fusion joint 183) formed during injection molding (FIG. 20) of the rigid probe body (36) or by mechanical tabs (178, 180). The flexible probe circuit is made of a flexible plastic strip (127) with sensor locations (124) and a leads connector (130) on one side (125) of a middle layer (127) through-connected (136) to associated elongate leads (134) on the opposite side of the middle layer (127) and two covering top and bottom protective covering layers (114, 138) on opposite sides of the middle layer (127).

25 Claims, 9 Drawing Sheets

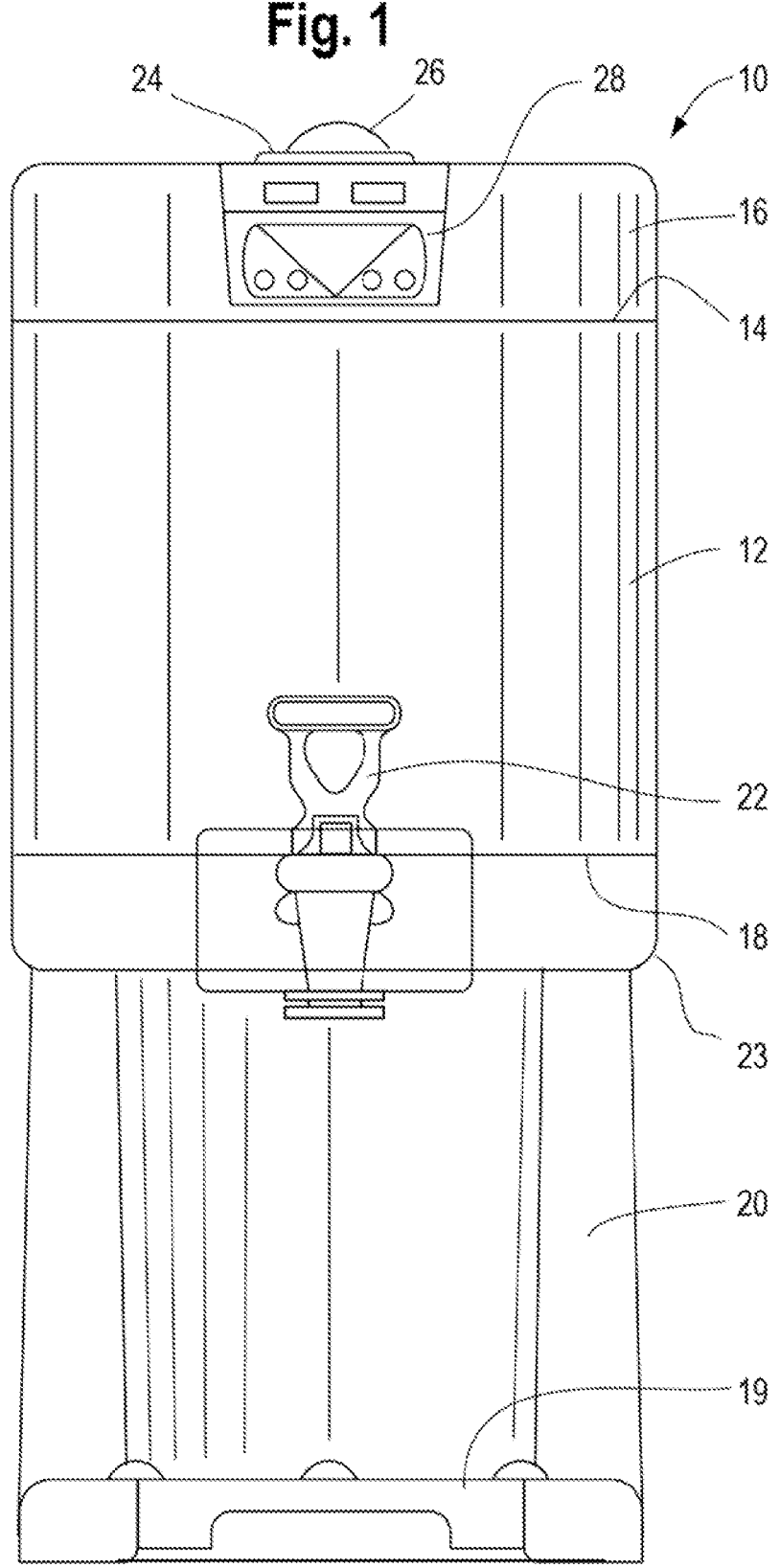

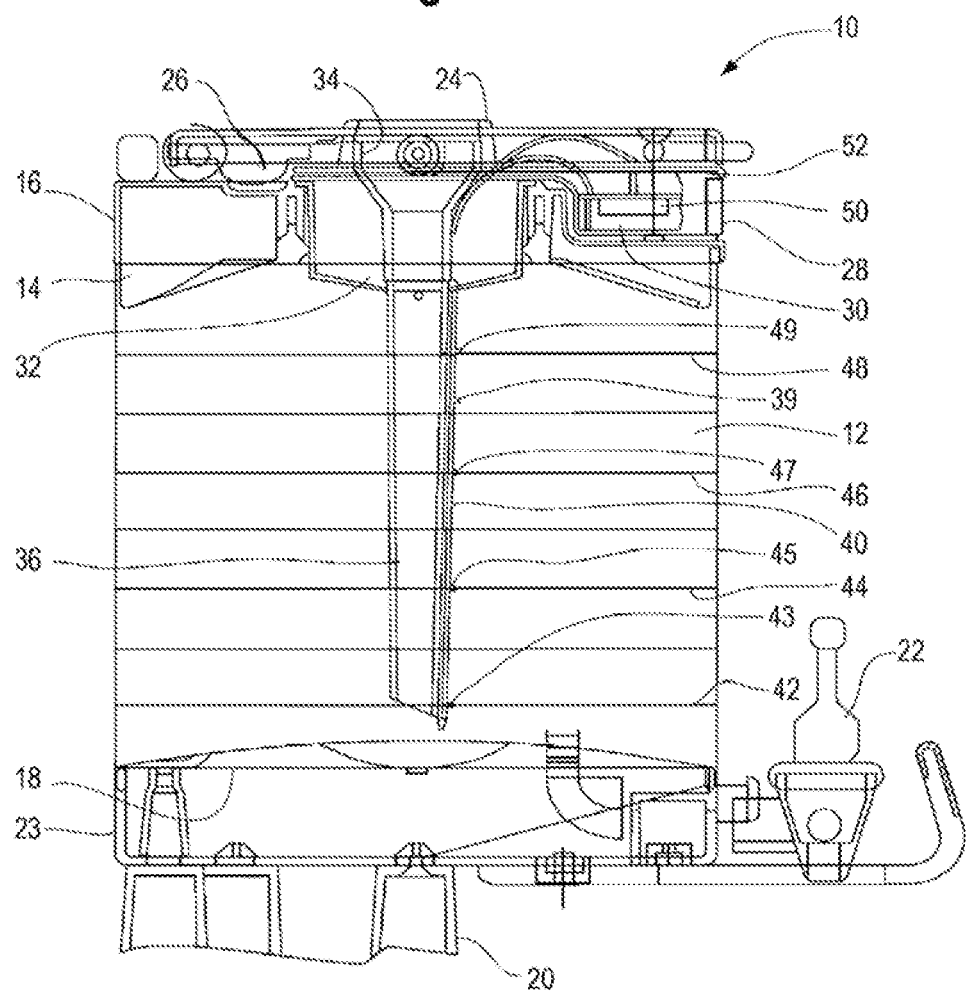

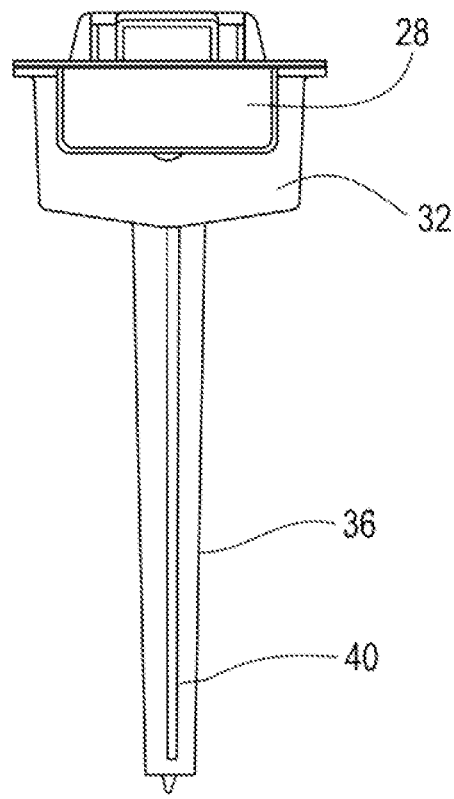

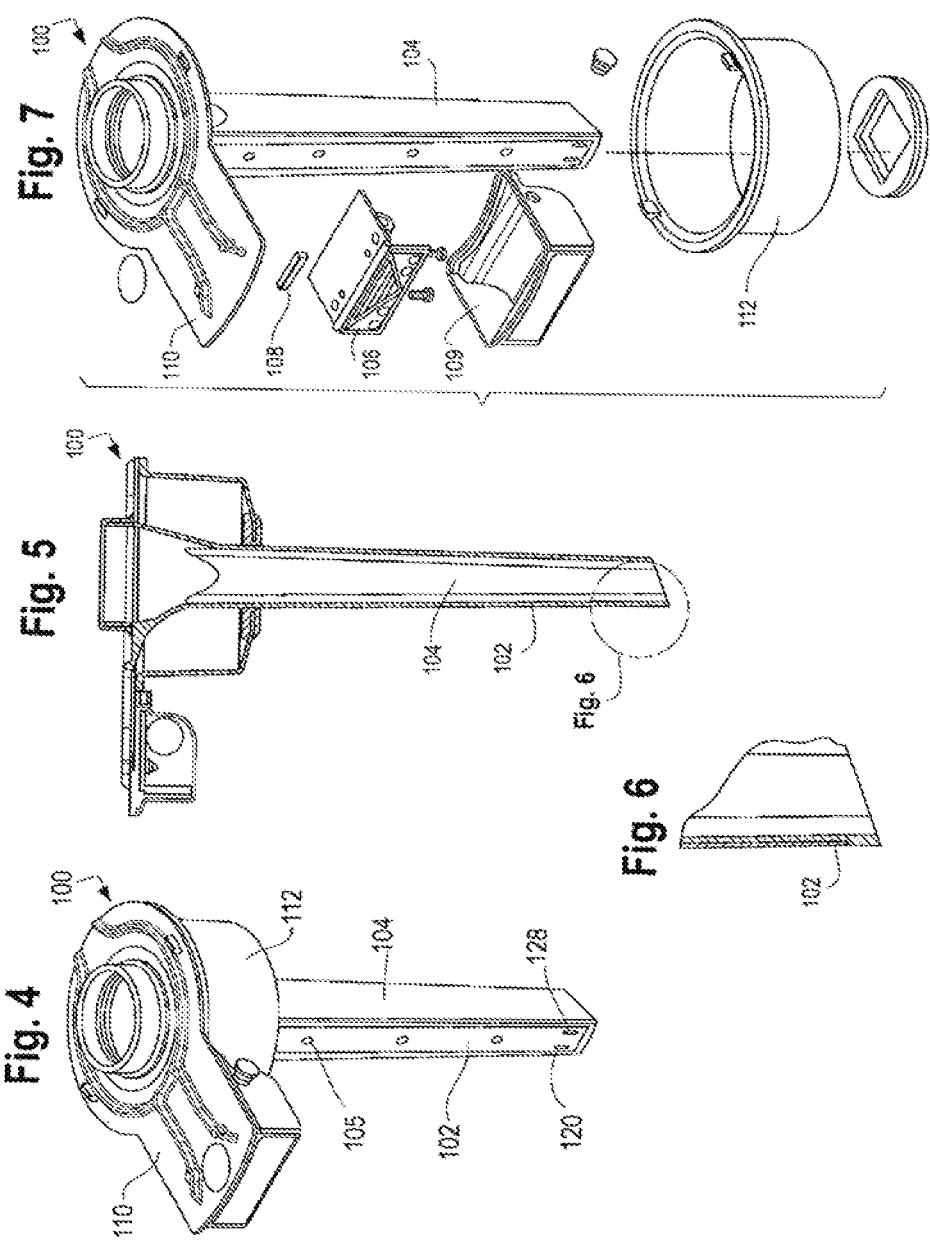

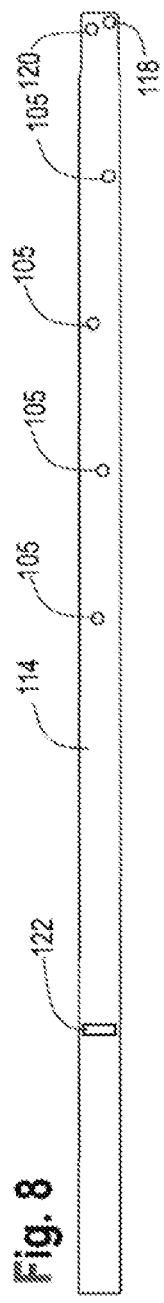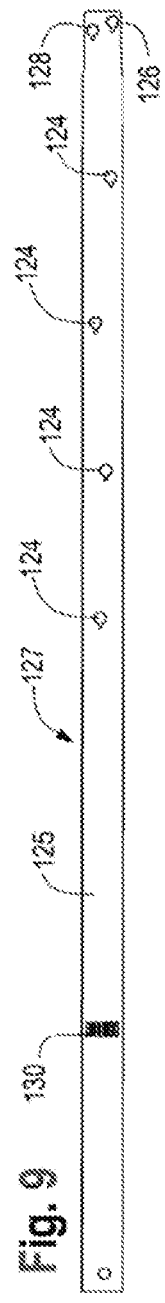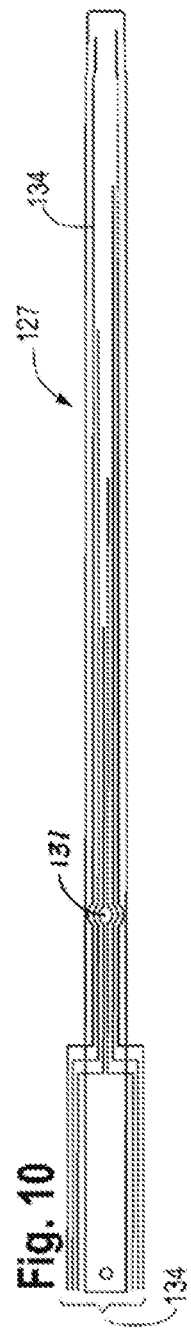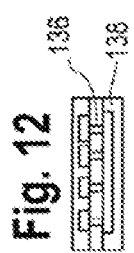

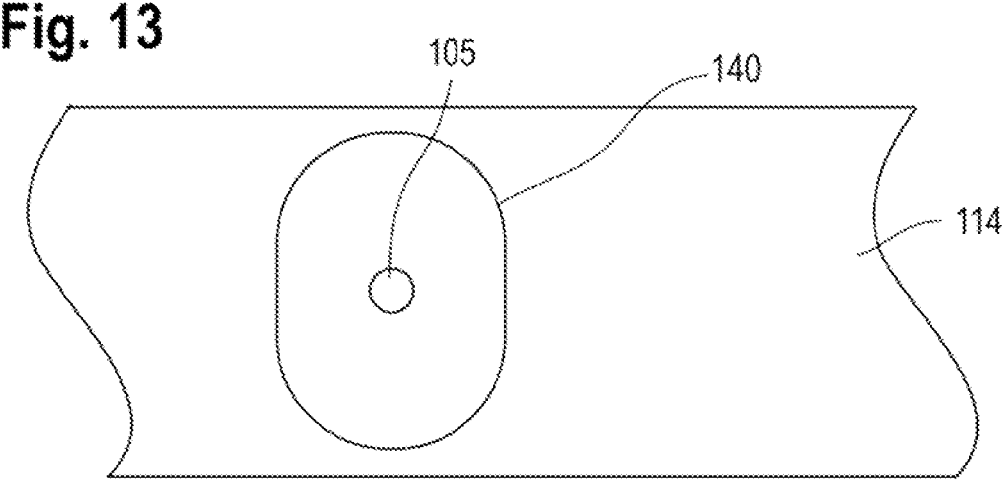
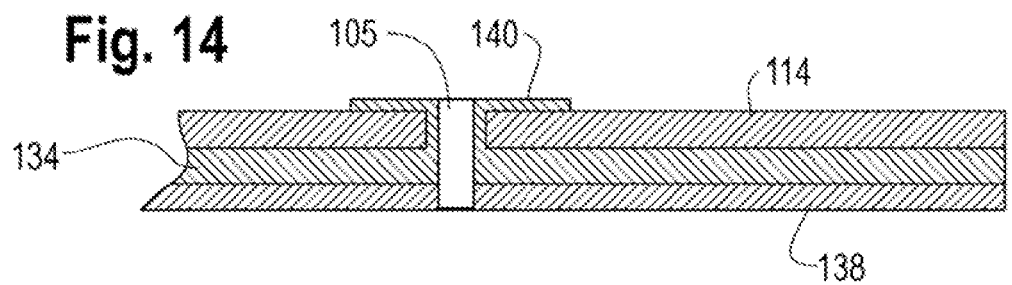
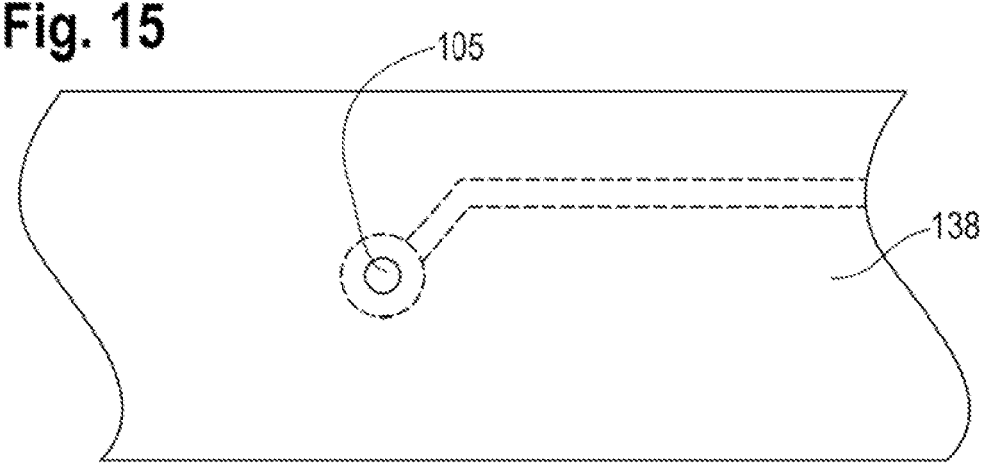

HOT BEVERAGE DISPENSER WITH LEVEL SENSING PROBE AND METHOD OF MAKING SAME

CROSS-REFERENCE TO RELATED APPLICATION

This application is a continuation-in-part of, and claims the benefit under 35 U.S.C 120, of U.S. application Ser. No. 12/250,963, filed Oct. 14, 2008 now U.S. Pat. No. 8,464,584, and entitled "Beverage Dispenser with Level Measuring Apparatus and Display", which is hereby incorporated by reference, and also claims the benefit under 35 U.S.C. 119(e) of provisional patent application No. 61/369,498, filed Jul. 30, 2010, which is hereby incorporated by reference.

BACKGROUND OF THE INVENTION

1. Field of the Invention

This invention generally relates to beverage dispensers with level indicating displays, and more particularly, to level sensing probes used in such dispensers and method of making same.

2. Discussion of the Prior Art

Commercial beverage dispensers of the type having a hollow, insulated body made of stainless steel or other opaque materials with a closable top for direct receipt of beverage from a beverage brewer are known. Such dispensers have a bottom supported above a support surface with a faucet for serving beverage from the hollow body into individual serving cups or the like.

Because the hollow body is made of opaque materials the quantity, or level, of the beverage can not be ascertained simply by viewing the outside of the dispenser, such as is possible with transparent glass carafes and the like. In the past, so-called "sight tubes" mounted on the outside of the dispenser but in fluid communication with the interior were used to provide a visual indication of the level of the beverage within the hollow body. However, these glass tubes are fragile and become stained over time and presented cleaning and hygiene problems.

In order to avoid these problems, it is known to provide an electronic level sensing circuit with a probe within the dispenser body and a visual electronic display mounted to the exterior of the body and responsive to the probe to provide and indication of the beverage level. Such a dispenser is shown and described in U.S. Pat. No. 6,741,180 issued May 25, 2004 to Zbigniew G. Lassota for an invention in "Beverage Dispensing Urn with Electronic Display", which is hereby incorporated by reference. In the resistive probe used in this dispenser, the resistance between electrically conductive lands on the exterior of a probe body and exposed to the beverage varied depending upon the level of the beverage being was measured to determine the quantity of beverage.

In another patent of Zbigniew G. Lassota, U.S. Pat. No. 7,798,373, issued Sep. 21, 2010 for an invention in an "Airpot Beverage Dispenser with Flow Thorough Lid and Display and Method", which is hereby incorporated by reference, a capacitive level probe is employed. This capacitive probe is formed by a series of capacitors at different levels that have a total capacitance that depends upon how many of the capacitors are below or above the surface of the beverage. Unlike the resistive the resistive probe, the capacitive plates do not have direct contact with the beverage but sense the beverage indirectly due to changes in dielectric constant.

In order to produce these level sensing probes, it is necessary to provide leads from each of the sensing elements, forming either a capacitor or a resistor within the dispenser body with a sensing circuit located outside of the dispenser body. It is also necessary to hold the sensing elements in a fixed spatial relationship relative to each other and to the bottom of the dispenser body. In the aforementioned patents, the sensing elements are directly mounted to a hollow down tube that extends downwardly from a funnel at the top of the dispenser to convey freshly brewed beverage to the bottom of the dispenser, but the mechanical mounting means that was employed was not always reliable. The funnel is part of a funnel assembly within which the display circuitry is protectively mounted and to which the beverage level display is mounted.

A need exists to make such probes reliably and cheaply and to mount the sensing elements to the probe bodies in a way that is secure, easily accomplished and compatible with contact with the beverage.

SUMMARY OF THE INVENTION

It is therefore an object of the present invention to provide a dispenser with a level sensing probe that is capable of being made on a mass production basis cheaply and effectively. and which can be used with hot beverages for human consumption.

This objective is achieved in part by providing a beverage dispenser having a hollow, insulated dispenser body, a removable cover with an inlet opening for receipt of freshly brewed beverage to an interior of the dispenser body, a closed bottom and a faucet for dispensing beverage from the body, with a level display system having an elongate, relatively flexible, probe body with a flexible probe circuit including a plurality of electrically conductive sensors, an elongate, relatively rigid, probe body that is rigid relative to the relatively flexible probe body, means for mounting the elongate, relatively rigid, probe body within the dispenser body and extending in a direction between the cover and the closed bottom of the dispenser body, an elongate mounting groove formed in, and extending along, the elongate relatively rigid probe body, and sized for snug receipt of the elongate, relatively flexible, probe body with a bottom surface of the flexible probe protectively resting on an outwardly facing bottom of the mounting groove and a top surface facing outwardly away from the groove, means for fixedly securing the flexible probe body within the groove with the bottom surface of the flexible probe protectively resting on the upwardly facing bottom of the groove and the top surface and sensors facing outwardly away from the groove, and an electronic display connected with the flexible probe circuit and responsive to beverage being located opposite different ones of the sensors for showing the amount of beverage within the dispenser body Preferably, the groove has a pair of opposite sidewalls, the flexible probe body has opposite sides, and the opposite sidewalls are retentively engaged with the opposite sides to restrain the flexible probe body against lateral movement within the groove. The retention members extend along the length of the groove, and the groove has opposite end walls, the flexible probe body has opposite ends and the opposite end walls are retentively engaged with the opposite end walls to restrain the flexible probe body against lateral movement within the groove. The flexible probe body is made from a flexible nonconductive material impervious to hot beverage.

In the preferred embodiment, the exposed surface of the flexible probe body carries a plurality of electrically conductive sensing locations spaced along the length of the elongate flexible circuit body. The flexible probe body carries a plurality of conductive leads attached to the plurality of conductive sensing locations, respectively, that extend along the length of the probe body in parallel relationship with each other for connection to other circuitry at one end of the flexible probe body. The leads are spaced from the top of the flexible probe body and protectively covered by a nonconductive material interposed between the leads and the bottom of the groove.

In one form of the flexible probe, the flexible probe body has two layers of nonconductive material, a first layer with a nonconductive surface being the exposed top of the probe body and carrying the conductive sensing locations and a protected non-exposed bottom carrying a plurality of parallel leads, and a second layer covering the leads and interposed between the leads and the bottom.

In another form of the flexible probe, another mounting groove in the relatively rigid probe body parallel to the one groove within which another flexible probe body is received, and another pair of retention members for retaining the other flexible probe body in mounting engagement within the other groove.

The object of the invention is also acquired in part by provision of a beverage dispenser having a hollow, insulated dispenser body, a removable cover with an inlet opening for receipt of freshly brewed beverage to an interior of the dispenser body, a closed bottom and a faucet for dispensing beverage from the body, with a level display system, having an electronic display assembly carried by a funnel assembly with a funnel opening for receipt of freshly brewed beverage and a down tube for conveying the beverage from the funnel opening to a location adjacent the bottom of the dispenser body, an elongate, flexible level sensing probe mounted along the elongate down-tube including a main elongate, layer of flexible polymer material with a front side carrying the plurality of electrically conductive sensors and an electrically conductive multiple lead connector, a back side with a plurality of elongate leads respectively connected to the plurality of electrically conductive sensors at one end through associated through-hole connectors and extending to another end opposite the one end for connection through a through-hole lead connector to the electrically conductive multiple lead connector, a top, elongate, layer of flexible polymer material overlying the front side of the main elongate layer with an access opening aligned with the multiple lead connector side, and a bottom, elongate layer of flexible polymer material overlying the back side of the main elongate layer protectively covering the plurality of elongate leads, and means for connecting the multiple lead connector to the electronic display, said electronic display assembly responding to signals on the multiple lead connector from the plurality of elongate leads to display.

Preferably, the polymer material Doosan® or a Doosan®-like material and the top layer and the bottom layer are both made from Ultem® or Ultem®-like material, preferably Ultem® 1010. In a resistive form of the probe, a plurality of sensor access openings in the top layer respectively aligned with the plurality of electrically conductive sensors are provided to enable physical contact of the plurality of sensors with the beverage. In the case of a capacitive probe, the conductive sensors may remain covered without any need for access openings. A pair of transversely aligned reference sensors located substantially equally adjacent a distal end of the down tube opposite the funnel assembly, and another plurality of measuring sensors located in spaced relationship along the down tube between the reference sensors and the funnel assembly.

In the preferred embodiment, the material of the bottom flexible layer and funnel assembly and the material of the down tube have the same glass transition temperature, and the bottom layer is attached to the down tube by a thermal fusion joint. The down tube has an elongate, outwardly facing mounting groove and the flexible probe is secured within the mounting groove by non-adhesive means, preferably a thermal fusion joint between the bottom layer and the mounting groove.

Alternatively, the non-adhesive securing means includes a mechanical tab attached to the down tube and overlying the top layer to prevent removal of the flexible sensor from the groove.

Achievement of the objective of the invention also acquired in part by providing a method of making a level sensing probe for use in a beverage dispenser, by performance of the steps of inserting an elongate flexible sensor probe into a cavity of an injection mold used to form a down tube of a funnel assembly mountable in a top opening of a beverage dispenser, holding the elongate sensor probe against an outer side of the injection mold cavity by the application of vacuum, injecting, into the mold cavity, material for construction of the down tube at a temperature sufficiently high to fuse a back surface of the elongate flexible sensor probe to an exterior side of the down tube being formed, allowing the down tube material within the mold cavity and the mold to cool sufficiently for the down tube material to solidify into a relatively rigid down tube, and removing the down tube with fused sensor probe from the mold.

Preferably, the material of the down tube is a thermal plastic, such as a polytheramid like Ultem® or Ultem®-like material, and the bottom layer is made of the same thermal plastic as the down tube. The elongate flexible probe is multilayered with an outer polymer layer having a glass transition temperature that is substantially the same as a glass transition temperature of the thermal plastic from which the down tube is made.

In the preferred practice of the method, included is the step of making the elongate flexible sensor probe before the step of inserting by performing the steps of providing a main layer made of a polymer with a preselected glass transition temperature and carrying a probe circuit on a surface of the main layer, covering the circuit on the surface of the main layer with a covering layer made of another polymer different from the one polymer of the main layer and having a glass transition temperature less than that of the one polymer and approximately equal to a glass transition temperature of the material injected into the mold cavity for construction of the down tube.

BRIEF DESCRIPTION OF THE DRAWINGS

The foregoing objects and features will be described in detail and other objects features and advantages will be made apparent from the following detailed description which is given with reference to the several figures of the drawing, in which:

FIG. 1 is a front elevation view of the dispenser of the present invention;

FIG. 2 is a cross-section side view of the dispenser body and showing the relative spatial relationship of the funnel assembly, probe and display;

FIG. 3 is a front elevation view of the funnel assembly apart from the dispenser;

FIG. 4 is a perspective view of one form of the funnel assembly of the present invention in which a resistive circuit is employed to sense the beverage level;

FIG. 5 is a cross sectional side view of the resistive sensing funnel assembly of FIG. 4;

FIG. 6 is an enlarged view of a portion of the down tube of FIG. 5 illustrating the multiply flexible resistive sensing circuit that has been thermally fused to the front of the down tube;

FIG. 7 is an exploded view of the funnel assembly of FIGS. 4-6 illustrating the various part of the funnel assembly in addition to the down tube;

FIG. 8 is a top view of the front covering layer of Ultem® 1010F of the three ply flexible resistive sensing circuit of FIGS. 4-7 illustrating the location of access openings for the beverage and for access to a connector on the top surface of the middle ply;

FIG. 9 is top view of the top surface of the Doosan® flexible PC circuit film 600 series or equivalent middle ply of the three ply flexible resistive circuit of FIGS. 4-7 illustrating the location of sensing pads aligned with the sensing access opening of FIG. 8 and the trace connectors;

FIG. 10 is a view through the front covering layer of the back surface of the Doosan® flexible PC circuit film middle ply of FIG. 9 illustrating the location of the traces or leads printed thereon for respective connection between the pad and the associated connectors;

FIG. 11 is a view of the back layer of Ultem® 1010F back cover layer;

FIG. 12 is an end view illustrating through hole connections between the circuit elements on the front surface of the middle Doosan® flexible PC circuit film layer and the associated circuit elements on the back surface of the middle Doosan® flexible PC circuit film layer;

FIG. 13 is a plan view of a resistive sensing pad similar to that of FIG. 9;

FIG. 14 is a sectional side view of the resistive sensing pad of FIG. 13 illustrating the through-hole connection with circuitry printed on the middle ply of the flexible resistive sensing circuit;

FIG. 15 is a bottom view of the section of flexible resistive sensing circuit;

DETAILED DESCRIPTION

Figure 16:
FIG. 16 is a view of the back covering Ultem® 1010F layer of a flexible capacitive sensing circuit that may be used in lieu of the flexible resistive sensing circuits of FIGS. 8-11.

Referring to FIG. 1, an embodiment of the beverage dispenser 10 of the present invention is seen to include a cylindrical, insulated body 12 with a top 14 closed by a cover 16. A bottom 18 of the body 12 is supported in cantilever fashion above a drip tray 19 by a support assembly 20. A manually operable faucet 22 attached to a bottom skirt 23 surrounding the bottom is used to dispense beverage into coffee cups or other containers placed on the drip tray 19. The removable cover has an inlet 24 for direct receipt of beverage from a mating beverage brewer. A pivotally mounted closure member 26 closes the inlet 24 after the dispenser body has been filled and before it is moved apart from the associated brewer to a serving location. In accordance with the invention, a visual electronic display 28, preferably a liquid crystal display provides a visual indication of the quantity of beverage remaining within the insulated body 12 in graphic form.

Referring now to FIGS. 2 and 3, the display 28 is mounted to the front of a beverage proof sealed electronics compartment 30 of a removable funnel assembly 32. The funnel assembly 32 includes a funnel 34 of which the inlet 24 is a part that is removably fitted within a mating opening in the cover 16. An elongate down tube 36 extends downwardly from the funnel to a location adjacent the bottom 18. The down tube 36 also functions as a relatively, rigid probe body and is therefore also referred to herein as the rigid probe body. Attached to the elongate down tube, or rigid probe body, 36 and extending from adjacent the top 14 to adjacent the bottom 18 is an elongate level sensing flexible probe assembly 40. The flexible probe assembly 40 has a flexible probe body 37 that is flexible relative to the relatively rigid probe body 36.

The flexible probe assembly 40 includes a flexible plastic probe body 37 along which are located sensing locations 43, 45, 47 and 49 at a plurality of different levels above the bottom, such as levels 42, 44, 46 and 48 or more. The sensing locations 43, 45, 47 and 49 are locations at which are located conductive sensing lands, pads, or sensors used to electronically sense the contiguous presence of the beverage when at the same level as the associated sensing lands. These sensors may be either resistive or capacitive circuit elements.

Still referring to FIG. 2, each of the plurality of sensing pads has an individual trace, or thin electrical lead, extending from the pad to a connection terminal at the upper most end of the flexible probe body 39. The end connector is connected via insulated wires to a controller 50 contained within the beverage-proof electronics compartment 30. Also contained within the electronics compartment is a battery or capacitor source of power 52 and interface between the leads and the controller and between the output of the controller and the input to the display 28.

The display module 50 is integrated into the funnel assembly 32 together with the battery power supply 78 and the controller 62 to eliminate the need for interconnecting switches. This combined, or integrated, structure also enables sealing all of the electrical elements together within beverage proof compartments and to enable removal of the display 50 and electronic elements as a single unit for replacement or repair.

Referring to FIGS. 4, 5, 6 and 7, a preferred embodiment of a resistive level sensing funnel assembly 100 is shown that is similar to the funnel assembly 32. The funnel assembly 100 employs a multilayered, flexible sensing circuit strip, or sensing circuit, 102 that is attached to the exterior of a down tube 104. The flexible sensing circuit strip 102 has a plurality of external conductive sensor pads, or sensors, 105 that are exposed at an exterior surface of the strip for contact with the beverage to change the resistance of the circuit as the beverage level changes to sense the different associated levels.

Preferably, both the flexible circuit strip 102 and the down tube 104 are made from Ultem® 1010F food grade material, and the flexible circuit strip 102 is thermally fused to the down tube 104 during the injection molding process in which the Ultem® 1010F is heated to a fusion temperature of 670-690 degrees Fahrenheit with injection at a pressure of 1800-2000 psi. As seen in FIG. 6, a battery powered electronic display assembly is connected to a connection end of the flexible sensing circuit strip 102 though a zebra connector 108 which is protectively housed within an electronic box 109 with a clear window and a hole for clear encapsulation of the battery powered electronic assembly 106. The housing box 109 is attached to a forwardly extending mounting member 110 by means of screw fasteners. Advantageously the electronics module may be separated from the remainder of the funnel assembly including the down tube 104 and forward extending mounting member 110 and disconnected from the connection end of the flexible circuit strip 102 at the zebra connector 108. A removable cap 112 carries a plug for the electrical zebra connector 108, and a silicon gasket seals the bottom of the cup to the down tube 104 for repair or replacement.

Referring to FIGS. 8, 9, 10, 11 and 12 the component parts of the three-ply flexible sensing circuit strip 102 is shown. The front cover layer 114 of FIG. 8 is made from an elongate strip of Ultem® 1010F that is approximately two mils thick with a plurality of four sensor access openings 105 for level sensing and two reference access openings 118 and 120. An access opening 122 is also provided for electrical connection of the flexible sensor circuit strip 102.

The four level sensing access openings, or through holes, 105 provide access of the beverage with four corresponding, underlying, substantially identical sensor pads 124 on the front surface 125 of a middle layer 127 to enable electrical contact with the beverage. Similarly, the two reference access holes 118 and 120 overlie and provide beverage access to two reference sensor pads 126 and 128 on the front surface 125. The connector access opening 122 provides access for connection of a zebra connector 130 connected with the six sensor pads 124. The connection of the sensor pads 124 is to a resistive detection display interface circuit which converts the signals from the sensors to display control signals that show the corresponding quantity of beverage within the dispenser body 12. Reference may U.S. Pat. No. 6,741,180, issued May 25, 2004 to Zbigniew G. Lassota for an invention in "Beverage Dispensing Urn with Electronic Display" and patents cited therein, which are hereby incorporated by reference, for details of a suitable interface circuit. Reference may also be made to U.S. application Ser. No. 12/250,963 filed Oct. 14, 2008, which is hereby incorporated by reference, and to other patent indicated herein for further details.

Referring to FIGS. 10 and 12, the back side 132 of the middle layer 127 carries six elongate traces, or leads, 134 that are respectively connected by means of through-hole connections 136, FIG. 12, with the four sensor pads 124 and the two reference sensor pads 126 and 128 at one end and to the six connector pads 130 at the opposite ends. these traces are generally parallel to each other except at open location 131. At location 131, the traces are expanded to prevent destruction of the traces by plastic flow from the injection gate at this position during construction of the probe assembly that might otherwise occur if the traces passed through the open location 131.

These leads 134 are protectively covered by a back cover layer 138 made from Ultem® 1010F that is two mils thick. The main layer, or middle layer, 26 is made from Doosan® flexible PC circuit film, or equivalent, and is approximately one to three mils thick.

After the three layers 114, 127 and 138 are assembled and aligned and the cross connections 136 are established, the three layers are fused together to form the single flexible resistive sensing circuit strip 102. Preferably, the down tube 104 is also made from Ultem® 1010F and the flexible resistive sensing circuit strip is attached to the front wall of the down tube 104, as shown in FIG. 4 by thermal fusion during injection molding of the down tube 104, as will be explained below in greater detail. In the case of fusion, the material of the outside layers 114 and 138 must be made of the same material as the down tube 104 so that they have the same melting temperature, while the middle layer 127 is made of a material, such as Doosan® that has a higher melting temperature.

Referring to FIGS. 13, 14 and 15, the access openings 105, 118 and 120 may be surrounded by conductive pads 140 and may pass though the back cover layer 138. The pads are preferably made from hard gold or palladium plated over a conductive material from which is also made the traces and the through-hole connections. The back of the middle layer 138 is adhered to the top of the inside bottom layer by means of a high temperature adhesive which is heat resistant to approximately 630-degrees Fahrenheit. The conductive circuit elements on the middle layer may be screen printed on both sides.

Referring to FIGS. 16, 17, 18 and 19, a flexible capacitive sensing circuit 142 may be substituted for the flexible resistive sensing circuit 105. The capacitive sensing circuit has a top cover layer 144 with an access opening for access to five connector pads 146 to connect to level determining circuitry. However, there are other access openings to any sensing pads, for capacitive sensing does not require direct contact with the beverage for sensing. The top cover layer 144 is made of ULTEM® 1010 food grade material.

Figure 17:
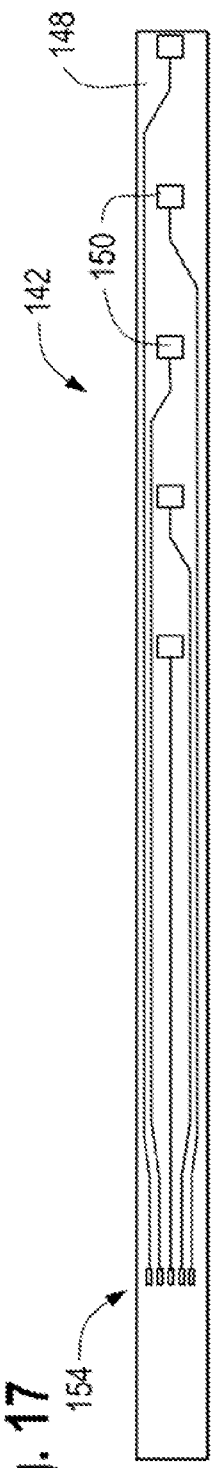
FIG. 17 is a front view of a middle Doosan® flexible PC circuit film layer back cover layer of the flexible capacitive sensing circuit showing the locations of a plurality of capacitive plates and traces leading from the respective capacitive plates to an associated plurality of connectors.
Figure 18:
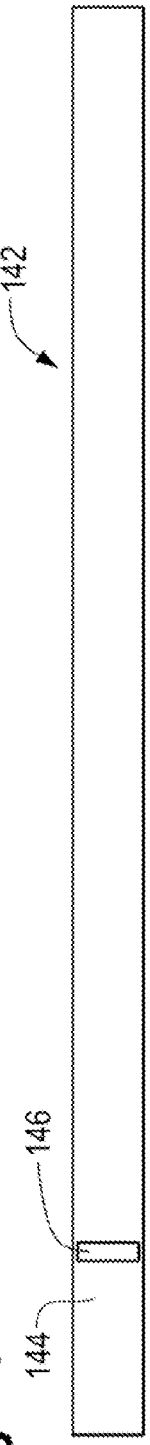
FIG. 18 is a front view of a top cover of Ultem® 1010 of the flexible capacitive sensing circuit with an access opening for external access to the connectors of the middle layer of FIG. 17.

The main, or middle, layer 148 has five substantially identical capacitor plates 150 on the top side shown in FIG. 17 with an associated five conductive traces 152 that are connected to five associated connection pads 154. Only a single plate is used for each level which forms a capacitor with the side of the metal, preferably stainless steel, body of the dispenser 10. The capacitance changes when the beverage is at the level of the one capacitor plate as opposed to when the beverage is absent.

Figure 19:
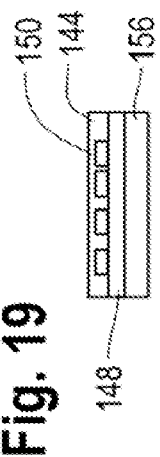
FIG. 19 is an end view of the flexible capacitive sensing circuit showing the location of the capacitive plates protectively embedded between the middle layer of FIG. 17 and the top cover layer of FIG. 18.

Again these plates may be constructed of a screen printed conductive polymer with copper or gold plated over nickel. The middle layer 148 is made from Doosan® flexible PC circuit film and is approximately one to three mils thick. The back cover layer 156, like the top cover 144, is made of Ultem® that is approximately two mils thick and is adhered to the back side of the middle Doosan® flexible PC circuit film layer 148, while the top cover layer 144 is adhered to the front side of the Doosan® flexible PC circuit film layer 148. The access opening 146 is aligned with the connectors 154 to provide access to the connectors 154:

As seen in FIG. 19, since there is no need for access openings to the capacitive sensors since the capacitance change does not require contact with the beverage. Accordingly, all the capacitive plates, or sensors 150 are protectively enveloped or encased between the top of the middle layer 148 and the top cover layer 164. The flexible capacitive sensing circuit may be used with a capacitive sensing circuit such as shown in US patent application US 2006/0106547 A1 Published May 28, 2006 of Szela et al. for "Electronic Method and System for Detection of Conducting or Dielectric Medium with Dielectric Constant Higher than That of Air". Reference may also be made to U.S. Pat. No. 7,798,373, issued Sep. 21, 2010 for an invention in an "Airpot Beverage Dispenser with Flow Thorough Lid and Display and Method" and patents cited therein, all of which are hereby incorporated by reference. Reference may also be made to U.S. patent application Ser. No. 12/731,436 filed Mar. 25, 2010, for further details concerning interface circuitry.

Figure 20:
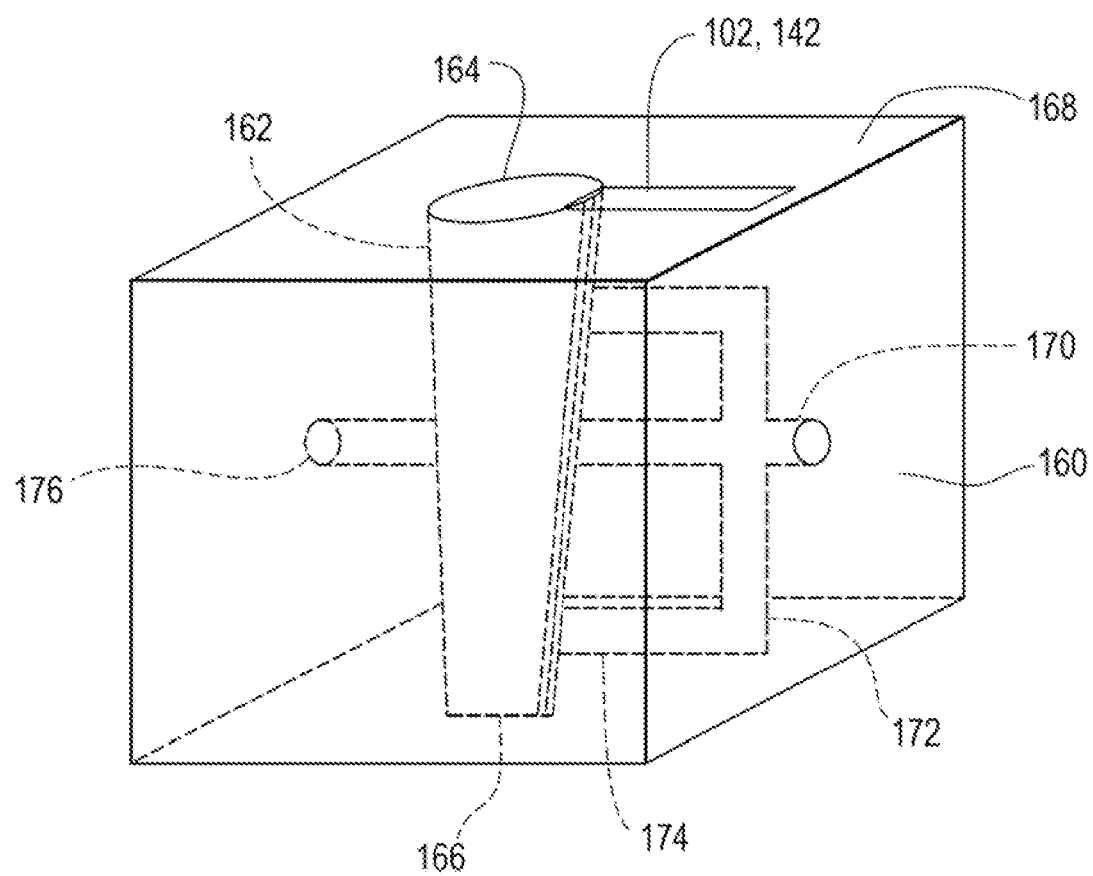
FIG. 20 is a schematic illustration of the mold piece that is used to define the outside walls of the down tube in combination with the flexible resistive circuit or the flexible capacitive circuit prior to attachment of the complimentary mold piece and thermal injection molding of the down tube with the flexible circuit thermally fused to the side of the down tube while held in place by vacuum suction.

Referring to FIG. 20, as indicated above, the flexible sensing circuits 102 or 142, whether resistive or capacitive, are preferably made from the same food grade material as the down tube 104 such that they may be thermally fused together in one step during injection molding of the down tube 104. In such case, a main mold piece 160 has a mold cavity 162 with a side wall that conforms to the exterior surface of the desired shape of the down tube 104 with a top opening 164. The flexible circuit 102 or 142 is lowered through the opening 164 until the bottom end is adjacent the bottom 166 of the cavity and the top end with the connectors is resting on the top 168 of the cavity 162. Another mold piece (not shown) corresponding to the inside wall of the down tube 104 is then lowered into the cavity 162 and tightly secured to seal the top opening 164 closed with the flexible circuit located along the inwardly facing wall of the cavity 162 with the back surface facing inwardly and the front face with the sensors facing outwardly against the inwardly facing surface of the mold cavity 162. The portion of the flexible circuit resting on the top 168 of the mold piece 160 rests within, and is kept properly aligned by means of an upwardly facing groove that curves slightly into the opening 164 to prevent squeezing of the upper portion of the flexible circuit when the top portion of the mold is fastened to the top 168 of the mold piece 160.

Vacuum is applied to an input port 170 of a vacuum manifold 172 with a plurality of output ports 174 aligned with the position of the flexible circuit 102 or 142 to hold it in place against the wall during the injection molding process. After the mold is closed and the vacuum applied, the Ultem® 1010F is heated and injected into the cavity 164 through an injection port 176 until the cavity is filled and the flexible circuit has been thermally fused against the side of the down tube 104. After the mold has cooled, the pieces are separated and the finished down tube 104 removed from the cavity 162. The top of the down tube 104 is later connected with the upper housing in which the electronic controls are located.

Figure 21:
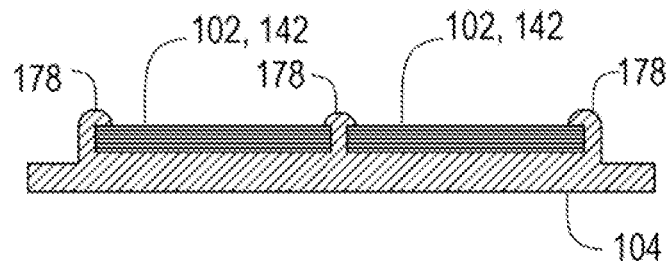
FIG. 21 is a sectional end view of a flexible circuit that is mechanically attached to a down tube with integrally formed grooves and retention tabs.
Figure 22:
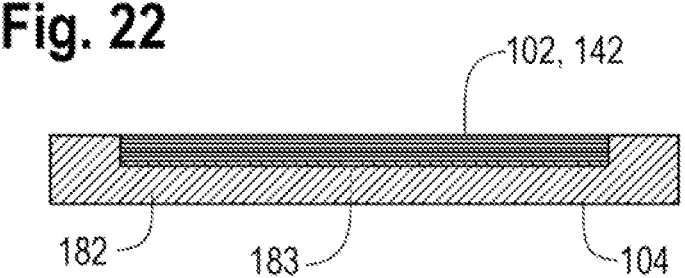
FIG. 22 is a sectional side view of another flexible circuit as adhesively attached flux within an integrally formed groove.
Figure 23:
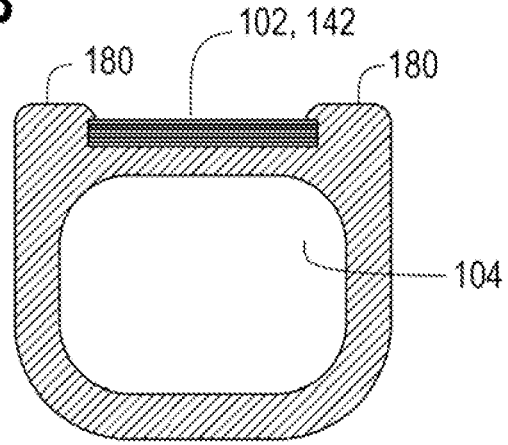
FIG. 23 is another section side view of another flexible circuit as mechanically attached and held within a groove by retention tabs integrally formed with the down tube.

Referring to FIGS. 21, 22 and 23, in lieu of thermal fusion, the flexible strip may be mechanically attached to the exterior of the down tube 106. In FIG. 21, the flexible circuit 102 or 142 is held to the exterior surface of the down tube by four overhanging tabs 178. In FIG. 23, the flexible circuit 102 or 142 is held in place by a pair of tabs 180 on opposite sides of the flexible circuit. In FIG. 22, the flexible circuit is attached to the bottom of a mating groove 182 formed in the side of the down tube 104 by a suitable thermal fusion joint 183. Alternatively, but not preferably, temperature resistant adhesive suitable for use with food may be used in lieu of the thermal fusion joint 18.

While particular embodiments of the flexible sensing circuits, the method of attachment of the sensing circuits to the down tube by thermal fusion and other attachment means and the method of making the flexible circuits have been disclosed, many obvious variations may be made thereto with departing from the scope and spirit of the invention. For example, while the flexible level sensing circuits have been disclosed with respect to use with a down tube of funnel assembly used with a beverage dispenser, it should be appreciated that the method of attaching the circuits to the down tube by thermal fusion to a solid substrate other than a down tube for level sensing.

The invention claimed is:

1. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:

an elongate, relatively flexible, probe body with a flexible probe circuit including a plurality of electrically conductive sensors for resistively or capacitively sensing the presence of beverage at a plurality of levels respectively associated with the plurality of electrically conductive sensors;

an elongate, relatively rigid, probe body that is rigid relative to the relatively flexible probe body;

means for removably mounting the elongate, relatively rigid, probe body within the dispenser body and extending in a direction between the cover and the closed bottom of the dispenser body, said removable mounting means including a removable funnel fitted within the inlet opening in the cover, said rigid probe being attached to the removable funnel assembly and extending downwardly therefrom into the hollow body;

an elongate mounting groove formed in, and extending along, the elongate relatively rigid probe body, and sized for snug receipt of the elongate, relatively flexible, probe body with one surface of the flexible probe protectively resting on an outwardly facing bottom of the mounting groove and another surface opposite the one surface facing outwardly away from the groove;

means for fixedly securing the flexible probe body within the groove with the one surface of the flexible probe protectively resting on the outwardly facing bottom of the groove and the other surface and sensors facing outwardly away from the groove; and an electronic display carried by the removable funnel assembly and connected with the flexible probe circuit, said electronic display being responsive to beverage being located opposite different ones of the sensors for showing the amount of beverage within the dispenser body.

2. The beverage dispenser of claim 1 in which the fixedly securing means includes at least one retention member attached to the relatively rigid probe at one side of the groove and partly overlying the other surface of the flexible probe to restrain the one surface of the relatively flexible probe body against outward movement away from contact with the bottom of the groove.

3. The beverage dispenser of claim 1 including a pair of retention members attached to opposite sides of the mounting groove and extending toward one another, said pair of retention members overlying the other surface of the flexible probe body to restrain the one surface of flexible probe body from outward movement away from mounting engagement with the bottom of the groove.

4. The beverage dispenser of claim 1 in which
the groove has a pair of opposite sidewalls,
the flexible probe body has opposite sides, and the opposite sides are retentively engaged with the opposite sidewalls to restrain the flexible probe body against lateral movement within the groove.

5. The beverage dispenser of claim 1 in which
the groove has opposite end walls, and
the flexible probe body has opposite ends that are respectively retentively engaged with the opposite end walls to restrain the flexible probe body against longitudinal movement relative to the mounting groove.

6. The beverage dispenser of claim 1 in which the relatively rigid probe and the relatively flexible probe are made from materials that
are impervious to hot beverage,
are suitable for use with hot beverages, and
have coefficients of thermal expansion that are substantially the same.

7. The beverage dispenser of claim 1 in which the plurality of electrically conductive sensors are spaced along the flexible probe circuit body and adjacent to the outwardly facing other surface for sensing of beverage located opposite the sensors.

8. The beverage dispenser of claim 7 in which the relatively flexible probe body carries a plurality of conductive leads respectively attached to the plurality of sensors at one end portion of the relatively flexible probe body and generally extending along the length of the relatively flexible probe body in parallel relationship with one another for connection to display interface circuitry at another end portion of the flexible probe body opposite the one end portion.

9. The beverage dispenser of claim 1 in which the relatively flexible probe body has
a first layer carrying the electrically conductive sensors, and
a protected, non-exposed bottom carrying a plurality of parallel leads respectively connected to the plurality of conductive sensors by means of through-connectors that pass through the first layer, and
a second layer covering the leads and interposed between the leads and the outwardly facing bottom of the groove.

10. The beverage dispenser of claim 1 in which the fixedly securing means includes
non-adhesive mounting means for fixedly securing the flexible probe body within the groove.

11. The beverage dispenser of claim 10 in which the non-adhesive mounting means includes a thermal fusion joint between the underside of the flexible probe body and the outwardly facing bottom of the groove.

12. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:
an elongate, relatively flexible, probe body with a flexible probe circuit including a plurality of electrically conductive sensors;
an elongate, relatively rigid, probe body that is rigid relative to the relatively flexible probe body;
means for mounting the elongate, relatively rigid, probe body within the dispenser body and extending in a direction between the cover and the closed bottom of the dispenser body;
an elongate mounting groove formed in, and extending along, the elongate relatively rigid probe body, and sized for snug receipt of the elongate, relatively flexible, probe body with one surface of the flexible probe protectively resting on an outwardly facing bottom of the mounting groove and another surface facing outwardly away from the groove;
means for fixedly securing the flexible probe body within the groove with the one surface of the flexible probe protectively resting on the upwardly facing bottom of the groove and the other surface and sensors facing outwardly away from the groove;
an electronic display connected with the flexible probe circuit and responsive to beverage being located opposite different ones of the sensors for showing the amount of beverage within the dispenser body; and in which
the flexible probe body carries a plurality of electrically conductive sensors spaced along the length of the elongate flexible circuit body and adjacent to the outwardly facing top for sensing of beverage located opposite the sensors,
the relatively flexible probe body carries a plurality of conductive leads respectively attached to the plurality of sensors at one end portion of the relatively flexible probe body and generally extending along the length of the relatively flexible probe body in parallel relationship with one another for connection to display interface circuitry at another end portion of the flexible probe body opposite the one end portion;
the sensors include conductive elements at sensor locations that are exposed to the interior of the dispenser body for direct contact with beverage, and
the leads, except where connected with the conductive elements at the sensor locations and exposed at an end of the relatively, flexible probe body for connection with other circuitry, are spaced from the other surface of the flexible probe body and protectively covered by a non-conductive material interposed between the leads and the outwardly facing bottom of the groove.

13. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:
an elongate, relatively flexible, probe body with a flexible probe circuit including a plurality of electrically conductive sensors;
an elongate, relatively rigid, probe body that is rigid relative to the relatively flexible probe body;
means for mounting the elongate, relatively rigid, probe body within the dispenser body and extending in a direction between the cover and the closed bottom of the dispenser body;
an elongate mounting groove formed in, and extending along, the elongate relatively rigid probe body, and sized for snug receipt of the elongate, relatively flexible, probe body with one surface of the flexible probe protectively resting on an outwardly facing bottom of the mounting groove and another surface facing outwardly away from the groove;
means for fixedly securing the flexible probe body within the groove with the one surface of the flexible probe protectively resting on the upwardly facing bottom of the groove and the other surface and sensors facing outwardly away from the groove; and
an electronic display connected with the flexible probe circuit and responsive to beverage being located opposite different ones of the sensors for showing the amount of beverage within the dispenser body, and including another flexible probe body, and in which the relatively, rigid probe body has another elongate mounting groove parallel to the one mounting groove within which the other flexible probe body is mounted.

14. The beverage dispenser of claim 13 including tabs mounted to the relatively rigid probe body that at least partly overlie both the one and the other grooves to block removal of the one and the other flexible probe bodies from the one and the other grooves, respectively.

15. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:
an elongate, relatively flexible, probe body with a flexible probe circuit including a plurality of electrically conductive sensors for resistively or capacitively sensing the presence of beverage at a plurality of levels respectively associated with the plurality of electrically conductive sensors;
an elongate, relatively rigid, probe body that is rigid relative to the relatively flexible probe body;
means for mounting the elongate, relatively rigid, probe body within the dispenser body and extending in a direction between the cover and the closed bottom of the dispenser body;
an elongate mounting groove formed in, and extending along, the elongate relatively rigid probe body, and sized for snug receipt of the elongate, relatively flexible, probe body with one surface of the flexible probe protectively resting on an outwardly facing bottom of the mounting groove and a another surface opposite the one surface facing outwardly away from the groove;
means for fixedly securing the flexible probe body within the groove with the one surface of the flexible probe protectively resting on the outwardly facing bottom of the groove and the other surface and sensors facing outwardly away from the groove; and
an electronic display connected with the flexible probe circuit and responsive to beverage being located opposite different ones of the sensors for showing the amount of beverage within the dispenser body; and in which
the flexible probe body has a middle layer and an outer covering layer, said middle layer being made of a polymer having a glass transition temperature substantially higher than the outer covering layers, said middle layer having one surface on which part of the probe circuit is carried, and
a covering layer covering the part of the probe circuit on the one surface of the middle layer, said covering layer being made from another polymer different from the one polymer of the middle layer and having a glass transition temperature less than that of the one polymer.

16. The beverage dispenser of claim 15 in which the middle layer is made of one type of polymer and the covering layer is made of another type of polymer different from the one type of polymer.

17. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:
an elongate, relatively flexible, probe body with a flexible probe circuit including a plurality of electrically conductive sensors;
an elongate, relatively rigid, probe body that is rigid relative to the relatively flexible probe body;
means for mounting the elongate, relatively rigid, probe body within the dispenser body and extending in a direction between the cover and the closed bottom of the dispenser body;
an elongate mounting groove formed in, and extending along, the elongate relatively rigid probe body, and sized for snug receipt of the elongate, relatively flexible, probe body with one surface of the flexible probe protectively resting on an outwardly facing bottom of the mounting groove and the other surface facing outwardly away from the groove;
means for fixedly securing the flexible probe body within the groove with the one surface of the flexible probe protectively resting on the upwardly facing bottom of the groove and the other surface and sensors facing outwardly away from the groove;
an electronic display connected with the flexible probe circuit and responsive to beverage being located opposite different ones of the sensors for showing the amount of beverage within the dispenser body; and in which
the flexible probe body has a middle layer and an outer covering layer, said middle layer being made of a polymer having a glass transition temperature substantially higher than the outer covering layers, said middle layer having one surface on which part of the probe circuit is carried, and
said outer covering layer covers the part of the probe circuit on the one surface of the middle layer, said covering layer being made from another polymer different from the one polymer of the middle layer and having a glass transition temperature less than that of the one polymer;
the elongate rigid probe is made from a polymer having the same glass transition temperature as that of the covering layer, and
the covering layer covers the entire one surface of the middle layer.

18. The beverage dispenser of claim 17 in which the covering layer has a surface spaced opposite from the one surface of the middle layer that is thermally fused to the outwardly facing bottom of the elongate mounting groove.

19. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:
an elongate, relatively flexible, probe body with a flexible probe circuit including a plurality of electrically conductive sensors;
an elongate, relatively rigid, probe body that is rigid relative to the relatively flexible probe body;
means for mounting the elongate, relatively rigid, probe body within the dispenser body and extending in a direction between the cover and the closed bottom of the dispenser body;
an elongate mounting groove formed in, and extending along, the elongate relatively rigid probe body, and sized for snug receipt of the elongate, relatively flexible, probe body with one surface of the flexible probe protectively resting on an outwardly facing bottom of the mounting groove and another surface facing outwardly away from the groove;
means for fixedly securing the flexible probe body within the groove with the one surface of the flexible probe protectively resting on the upwardly facing bottom of the groove and the other surface and sensors facing outwardly away from the groove; and
an electronic display connected with the flexible probe circuit and responsive to beverage being located opposite different ones of the sensors for showing the amount of beverage within the dispenser body; and in which
the elongate, relatively rigid, probe body is at least part of a down tube of a funnel assembly mounted to the open top of the dispenser body.

20. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:
an electronic display assembly carried by a funnel assembly with a funnel opening for receipt of freshly brewed beverage and a down tube for conveying the beverage from the funnel opening to a location adjacent the bottom of the dispenser body;
an elongate, flexible level sensing probe mounted along the elongate down-tube including
a main elongate, layer of flexible polymer material with
a front side carrying a plurality of electrically conductive sensors and an electrically conductive multiple lead connector,
a back side with a plurality of elongate leads respectively connected to the plurality of electrically conductive sensors at one end through associated through-hole connectors and extending to another end opposite the one end for connection through a through-hole lead connector to the electrically conductive multiple lead connector,
a top, elongate, layer of flexible polymer material overlying the front side of the main elongate layer with an access opening aligned with the multiple lead connector side,
a bottom, elongate layer of flexible polymer material overlying the back side of the main elongate layer protectively covering the plurality of elongate leads; and
means for connecting the multiple lead connector to the electronic display, said electronic display assembly responding to signals on the multiple lead connector from the plurality of elongate leads to display, and including
a plurality of sensor access openings in the top layer respectively aligned with the plurality of electrically conductive sensors to enable physical contact of the plurality of sensors with the beverage.

21. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:
an electronic display assembly carried by a funnel assembly with a funnel opening for receipt of freshly brewed beverage and a down tube for conveying the beverage from the funnel opening to a location adjacent the bottom of the dispenser body;
an elongate, flexible level sensing probe mounted along the elongate down-tube including
a main elongate, layer of flexible polymer material with
a front side carrying a plurality of electrically conductive sensors and an electrically conductive multiple lead connector,
a back side with a plurality of elongate leads respectively connected to the plurality of electrically conductive sensors at one end through associated through-hole connectors and extending to another end opposite the one end for connection through a through-hole lead connector to the electrically conductive multiple lead connector,
a top, elongate, layer of flexible polymer material overlying the front side of the main elongate layer with an access opening aligned with the multiple lead connector side,
a bottom, elongate layer of flexible polymer material overlying the back side of the main elongate layer protectively covering the plurality of elongate leads;
means for connecting the multiple lead connector to the electronic display, said electronic display assembly responding to signals on the multiple lead connector from the plurality of elongate leads to display; and in which
the plurality of electrically conductive sensors includes
a pair of transversely aligned reference sensors located substantially equally adjacent a distal end of the down tube opposite the funnel assembly, and
another plurality of measuring sensors located in spaced relationship along the down tube between the reference sensors and the funnel assembly.

22. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:
an electronic display assembly carried by a funnel assembly with a funnel opening for receipt of freshly brewed beverage and a down tube for conveying the beverage from the funnel opening to a location adjacent the bottom of the dispenser body;
an elongate, flexible level sensing probe mounted along the elongate down-tube including
a main elongate, layer of flexible polymer material with
a front side carrying a plurality of electrically conductive sensors and an electrically conductive multiple lead connector,
a back side with a plurality of elongate leads respectively connected to the plurality of electrically conductive sensors at one end through associated through-hole connectors and extending to another end opposite the one end for connection through a through-hole lead connector to the electrically conductive multiple lead connector,
a top, elongate, layer of flexible polymer material overlying the front side of the main elongate layer with an access opening aligned with the multiple lead connector side,
a bottom, elongate layer of flexible polymer material overlying the back side of the main elongate layer protectively covering the plurality of elongate leads; and
means for connecting the multiple lead connector to the electronic display, said electronic display assembly responding to signals on the multiple lead connector from the plurality of elongate leads to display; and in which
the material of the bottom flexible layer and funnel assembly and the material of the down tube have the same glass transition temperature, and the bottom layer is attached to the down tube by a thermal fusion joint.

23. In a beverage dispenser having a hollow, insulated dispenser body, a removable cover with an inlet opening for receipt of freshly brewed beverage to an interior of the dispenser body, a closed bottom and a faucet for dispensing beverage from the body, the improvement being a level display system, comprising:

an electronic display assembly carried by a funnel assembly with a funnel opening for receipt of freshly brewed beverage and a down tube for conveying the beverage from the funnel opening to a location adjacent the bottom of the dispenser body;

an elongate, flexible level sensing probe mounted along the elongate down-tube including
  a main elongate, layer of flexible polymer material with
    a front side carrying a plurality of electrically conductive sensors and an electrically conductive multiple lead connector,
    a back side with a plurality of elongate leads respectively connected to the plurality of electrically conductive sensors at one end through associated through-hole connectors and extending to another end opposite the one end for connection through a through-hole lead connector to the electrically conductive multiple lead connector,
  a top, elongate, layer of flexible polymer material overlying the front side of the main elongate layer with an access opening aligned with the multiple lead connector side,
  a bottom, elongate layer of flexible polymer material overlying the back side of the main elongate layer protectively covering the plurality of elongate leads; and means for connecting the multiple lead connector to the electronic display, said electronic display assembly responding to signals on the multiple lead connector from the plurality of elongate leads to display; and in which the down tube has an elongate, outwardly facing mounting groove, and the flexible probe is secured within the mounting groove by non-adhesive means.

24. The beverage dispenser of claim 23 in which the non-adhesive means is a thermal fusion joint between the bottom layer and the mounting groove.

25. The beverage dispenser of claim 23 in which the non-adhesive securing means includes a mechanical tab attached to the down tube and overlying the top layer to prevent removal of the flexible sensor from the groove.

* * * * *